Aug. 26, 1969   R. G. SPINNETT   3,463,128
ROTARY ENGINE
Filed Sept. 15, 1967   2 Sheets-Sheet 1

INVENTOR
RAYMOND G. SPINNETT
BY
ATTORNEY

Aug. 26, 1969   R. G. SPINNETT   3,463,128
ROTARY ENGINE

Filed Sept. 15, 1967   2 Sheets-Sheet 2

INVENTOR
RAYMOND G. SPINNETT
BY Allen E. Bohney
ATTORNEY

United States Patent Office 3,463,128
Patented Aug. 26, 1969

3,463,128
ROTARY ENGINE
Raymond G. Spinnett, North Hollywood, Calif.
(1961–A Mitchell, Santa Ana, Calif. 92705)
Filed Sept. 15, 1967, Ser. No. 668,150
Int. Cl. F02b 53/00, 55/00
U.S. Cl. 123—11                            9 Claims

ABSTRACT OF THE DISCLOSURE

The present invention relates to a new and novel type of rotary engine containing few moving parts and highly efficient in its operation. The simplest possible symmetrical form of this invention has only three basic moving parts, but performs the same function as the eight cylinder, four-stroke cycle, rectilinear type of reciprocating engine.

---

The present invention relates to rotary engines in general and to the axial reciprocation type in particular wherein two rotary pistons, each having a pair of diametrically opposed paddles interposed between the other pair, form four sealed chambers inside a cylindrical case, the volume of the chambers being made to alternately increase and decrease by virtue of the constantly changing axial positions of the rotary pistons relative to each other.

The basic type of rotary engine was granted Patent No. 309,734 in 1884 and many improvements have been added since, as can be seen in Patents 903,740; 1,946,136; 2,248,029; 2,342,515; 2,612,878; 3,034,486; and 3,203,405; as well as many others. However, still further improvements are needed if the rotary engine is to become a commercial success and its many benefits and advantages enjoyed.

Accordingly, it is the object of the present invention, as said invention is described and claimed herein, to incorporate such improvements and such a combination of novel features in the rotary engine as will create, for the first time, a practical and economically built rotary engine of the axial reciprocation type. However, the improvements and novel features of this invention, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1B:
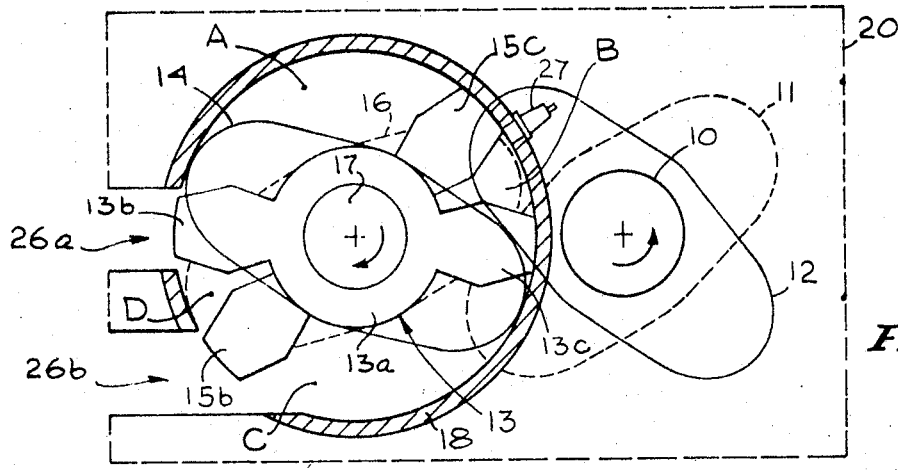
FIGURE 1(b) shows the embodiment of FIGURE 1(a) at the end of its stroke, which is also the beginning of a new stroke.
Figure 1A:
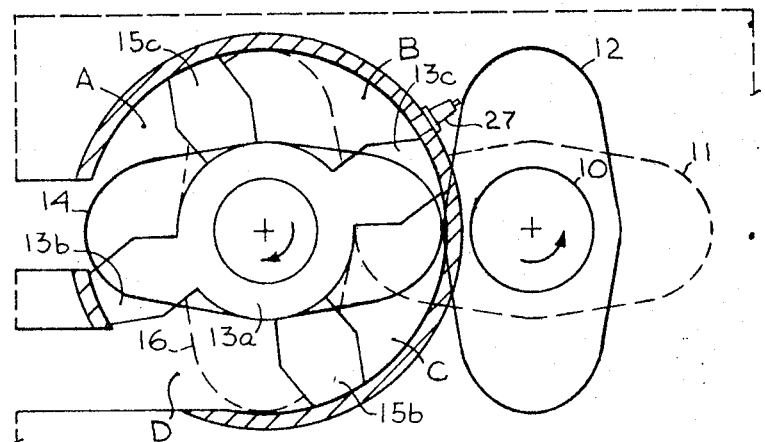
FIGURE 1(a) is an end view, in cross section, of the simplest form of an embodiment of the present invention illustrated in the middle of its stroke.
Figure 2:
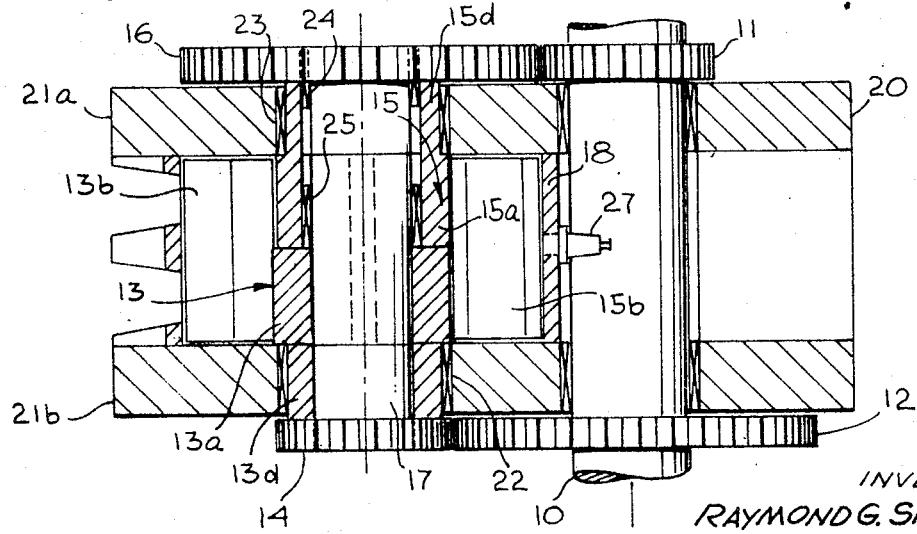
FIGURE 2 is a cross-sectional view of the arrangement shown in FIGURES 1(a) and 1(b)

For a consideration of the invention in detail, reference is now made to the drawings wherein, in FIGS. 1(a), 1(b) and 2, the embodiment therein is shown to include three basic groups of moving parts, namely, a first group comprising a main shaft 10 with bi-lobe gears 11 and 12 fixedly mounted thereon, this assembly being rotatably mounted on the main frame 20 of the engine, a second group comprising a rotary piston 13 with a single bi-lobe gear 14 coupled thereto by means of a hollow shaft 13d, and a third group comprising a second rotary piston 15 with a single bi-lobe gear 16 coupled thereto by means of a hollow shaft 15d. Rotary piston 13 is fixedly mounted on axle 17, while rotary piston 15 is rotatably mounted on said axle to permit relative motion between said rotary pistons. This assembly of axle and rotary pistons is in turn rotatably mounted inside of and co-axial with a cylindrical case 18 that is part of the main frame 20 of the engine. Bi-lobe gears 16 and 14 are mounted outside the cylindrical case, end plates 21a and 21b serving as bearing supports for rotary pistons 15 and 13, respectively, as well as covers for the ends of cylindrical case 18, as may be clearly seen from FIG. 2.

Considering each of the above-mentioned groups of moving parts with greater particularly, in the first group main shaft 10 extends through the engine frame 20 and is rotatably mounted therein, the bi-lobe gears 11 and 12 being fixedly mounted on the main shaft 10 external to the engine frame 20 on opposite ends of said shaft and displayed axially 90 degrees apart. The purpose of this assembly, in conjunction with bi-lobe gears 16 and 14, respectively, is to convert the substantially constant rotational velocity of the main shaft 10 to the varying rotational velocity of the rotary pistons 15 and 13, respectively, in the proper phase relationship to produce an axially reciprocating relationship between said rotary pistons. The unique shape of the pitch line of the above mentioned bi-lobe gears will be described further on. With respect to the second group, rotary piston 13 and bi-lobe gear 14, which are on opposite sides of and rotatably mounted on end plate 21b by way of bearing 22, are driven by bi-lobe gear 12 which is in constant mesh with bi-lobe gear 14, the axes of the two gears being parallel as can be seen from FIG. 2. Hollow shaft 13d serves as a means for coupling bi-lobe gear 14, through end plate 21b, to hub 13a of rotary piston 13. Two diametrically opposed rigid paddles 13b and 13c extend radially from the hub 13a to the inside surface of the cylindrical case 18. The shape of these paddles constitutes an important improvement, as will be explained further on. As can be seen from FIG. 2, the paddles 13b and 13c of rotary piston 13 extend for the full length of the case 18, whereas the hub 13a extends for only one half the length of the case, being fixedly mounted on axle 17. In the third group, rotary piston 15 and bi-lobe gear 16 are rotatably mounted at the opposite end of axle 17 from the second group. The third group being of an identical construction to that of the second group, piston hub 15a extends for the remaining one half length of the case 18 and is rotatably mounted on axle 17 by way of bearings 24 and 25. The axle 17 serves as a means of holding rotary pistons 13 and 15 in alignment, while permitting relative motion between them. This arrangement makes possible the rotatable mounting of the entire assembly of said rotary pistons and axle on the end plates 21a and 21b of the cylindrical case 18 by way of bearings 23 and 22 for the purpose of making the structure as rigid and durable as possible. The paddles 15c and 15d extend for the full length of the case 18 and radially to the inside surface thereof and are interposed between the paddles of rotary piston 13 to form four sealed chambers that alternately increase and decrease in volume as the relative axial positions of the two rotary pistons change in a reciprocating manner. Rotary piston 15 is likewise coupled to bi-lobe gear 16 by way of a hollow shaft 15d passing through end plate 21a, being rotatably mounted thereon and driven by bi-lobe gear 11 which is in constant mesh with bi-lobe gear 16.

Looking at the piston paddles 13b and 13c as well as 15b and 15c from the end view, as shown in FIG. 1(a) and 1(b), the outer ends can be seen to be made narrow by omitting the outer corners that would be included in a full semi-circular sector. These outer ends are beveled off or made narrow to reduce the inertial stresses of the varying rotational velocity of the rotary pistons and also to provide an improved shape, one resembling a triangle, for the chambers when they are in the beginning of their combustion stroke, as in chamber B in FIG. 1(b). By so doing, a longer period of exposure is provided for each of said combustion chambers to the igniter, such as spark plug 27 in FIG. 1(b), thus allowing for variations in ignition timing and also to provide for a controlled amount of overlap between the exhaust and intake port timing, as is customary in the design of a modern high speed internal combustion engine. This is illustrated by the position of chamber D with respect to exhaust port 26b and intake port 26a in FIG. 1(b).

Completing the basic engine structure taught herein is an intake port 26a, a spark plug 27, and an exhaust port 26b, the one intake port, spark plug, and exhaust port serving all four chambers as they successively pass through the intake, compression, combustion, and exhaust phases once for each revolution of the main shaft.

Considering now its operation, each rotary piston rotates clockwise one revolution for each revolution of the main shaft in the counter-clockwise direction, as seen from FIGS. 1(a) and 1(b). Although the main shaft runs at a relatively constant rotational velocity, the rotary pistons have a modulated motion, due to the constantly changing ratio of the bi-lobe gears. More specifically, when bi-lobe gear 11 maxima is in mesh with bi-lobe gear 16 minima, bi-lobe gear 12 minima is in mesh with bi-lobe gear 14 maxima. Consequently, bi-lobe gear 16 and rotary piston 15 are instantaneously running at approximately twice the speed of the main shaft 10 while bi-lobe gear 14 and rotary piston 13 are instantaneously running at approximately one-half the speed of the main shaft 10. In this same position, as shown in FIG. 1(a), chambers A, B, C, and D are in the middle of the intake, compression, combustion, and exhaust strokes, respectively.

As the main shaft 10 is rotated counter-clockwise through a 45 degree angle, both rotary pistons are instantaneously running at the same speed. In this same position, as shown in FIG. 1(b), chambers A, B, C, and D are now at the end of the intake, compression, combustion, and exhaust strokes, respectively. This change in the relative positions of rotary pistons 15 and 13 is caused by the previously faster rotation of rotary piston 15 and the previously slower rotation of rotary piston 13. Also, chambers A, B, C, and D are at the beginning of a new stroke, namely, the compression, combustion, exhaust and intake strokes, respectively. A further 45 degree counter-clockwise rotation of the main shaft will cause rotary piston 13 to be instantaneously running at approximately twice the speed of the main shaft when bi-lobe gear 12 maxima will be in mesh with bi-lobe gear 14 minima, and rotary piston 15 to be instantaneously running at approximately one-half the main shaft speed when bi-lobe gear 11 minima will be in mesh with bi-lobe gear 16 maxima.

This process is repeated four times for every revolution of the main shaft 10 so that each of the four chambers A, B, C, and D successively pass through the intake, compression, combustion, and exhaust strokes once for each revolution of the main shaft. This is equivalent to an eight cylinder four stroke cycle piston engine passing through its cycles once for every two revolutions of its crank shaft, each making four complete four-stroke cycles per revolution of its shaft. The simplicity of this embodiment of the present invention can be readily seen, its three moving parts performing the same function as the many moving parts of a conventional eight cylinder engine.

Figure 3:
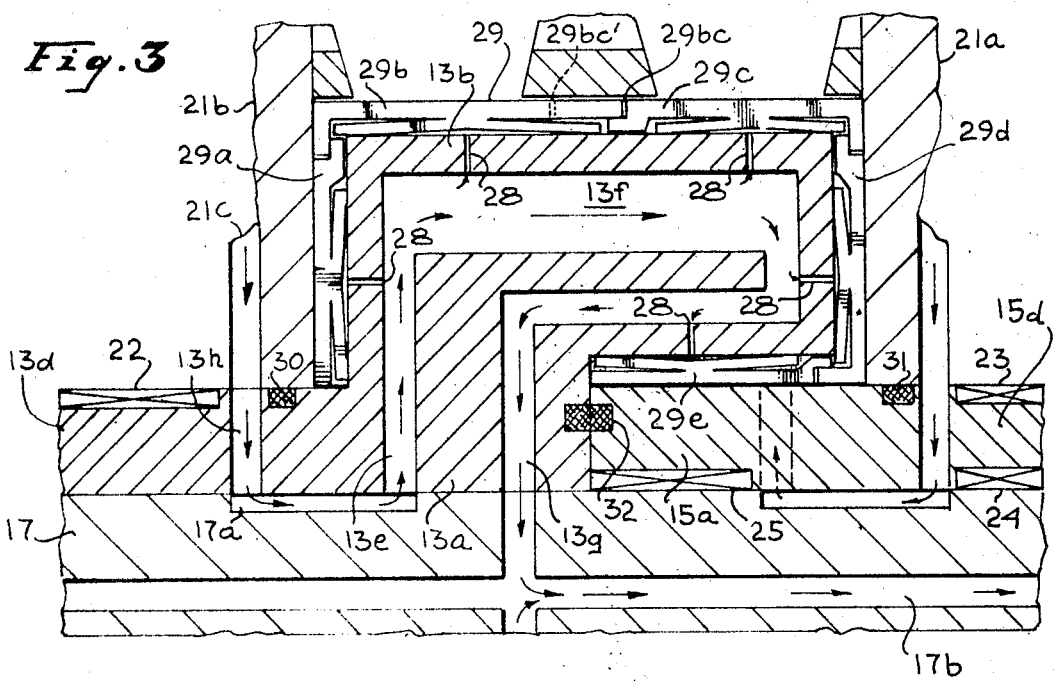
FIGURE 3 is a side view in cross-section of an engine according to the present invention and shows in greater detail the sealing, cooling and lubrication of the engine.

The manner in which the rotary pistons are made to seal the chambers and the manner in which the rotary pistons are cooled and lubricated is illustrated in FIG. 3, to which reference is now made. As shown therein, paddle 13b, which is typical of all the paddles, is hollowed out by a plurality of channels 13e, 13f, and 13g which connect one with another to form a continuous passageway through the paddle. FIG. 3 also shows that channel 13e connects with a groove 17a cut into the surface of axle 17 and channel 13g connects with still another channel 17b running through the center of the axle. In turn, the abovesaid groove 17a connects with another channel 13h through hub 13d which itself connects with a channel 21c extending through end plate 21b. Channel 21c ultimately connects to a pump which pumps the lubricating coolant, customarily oil, through the mentioned passages in the direction of the arrows shown in the figure. Under pressure from the pump, some of the oil passes through the small openings, designated 28, in the walls of the paddle to the seal 29 which is fit into a groove surrounding the paddle, the oil thus escaping the groove and the seal by capillary action lubricating the surfaces contacted by the seal in the course of its rotation, namely, the surfaces of case 18 and of end plates 21a and 21b, and hub 15a. Seal 29 actually comprises a plurality of smaller seals joined together with overlapping joints at the ends of adjacent seals to prevent the loss of oil therebetween. FIG. 3 shows a set of these smaller seals as 29a, b, c, d, and e. Also, in the same groove, lying parallel to 29a, b, c, d, and e is a second identically constructed set of smaller seals, 29a', b', c', d', and e', not shown. Each of these smaller seals is so constructed as to incorporate an integral spring to hold it outward against the case, end plates, or hub of the opposite piston, whichever it is in contact with. The joints of the two parallel sets of smaller seals are offset one from the other to prevent compression loss through said joints, as exemplified by 29bc and 29bc'. This arrangement of seals is flexible enough to absorb misalignment and thermal expansion and yet effectively seal the chambers without being precisely fitted to the size of the same. Seals 30, 31, and 32 in FIG. 3 are used to prevent compression loss through the bearings and to keep the oil out of the chambers.

Before describing the unique pitch line shape of the bi-lobe gears used in embodiments of the present invention, it should be noted that several of the patents of the prior art have shown bi-lobe gears of various shapes in embodiments of inventions, but that the shapes of said bi-lobe gear pitch lines were not described in a precise manner. It should be further noted that some of said embodiments erroneously showed an elliptical pitch line shape for a pair of bi-lobe gears, which will not maintain rolling contact because the axis of rotation would be in the center. The elliptical pitch line shape will maintain rolling contact only when the axis of rotation is at one of the focal points of the ellipse. This fact is common knowledge to those skilled in the art of designing lobed gears.

Figure 4:
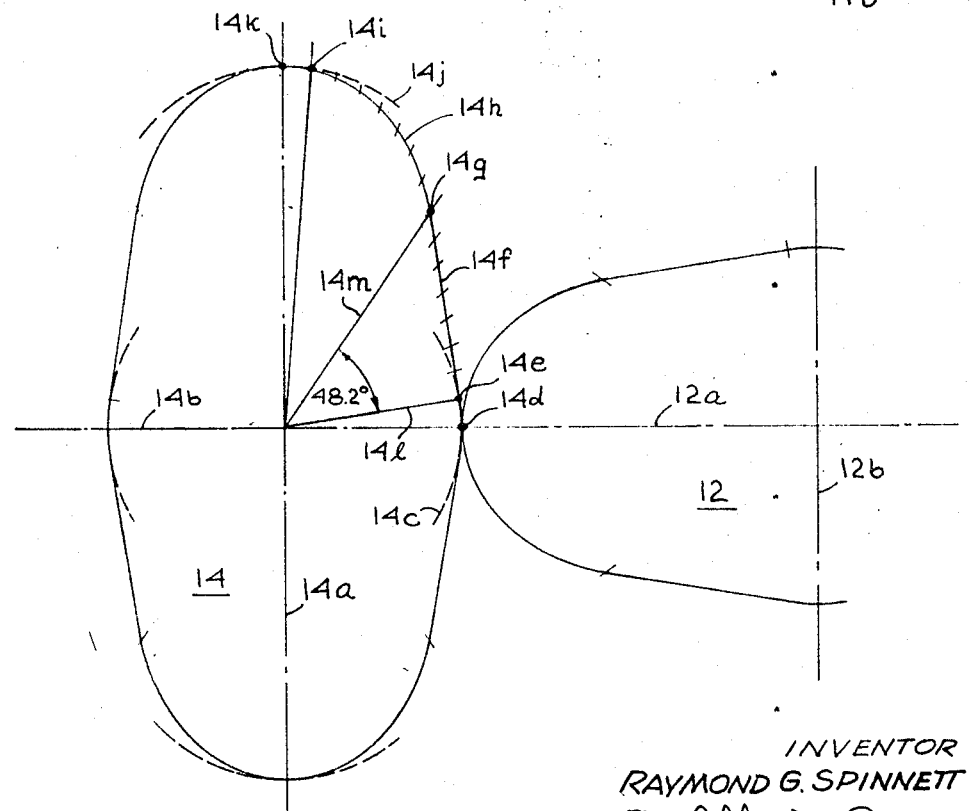
FIGURE 4 illustrates how the unique shape of the pitch lines of the bilobe gears utilized in embodiments of the present invention are obtained.

The unique pitch line shape herein described and illustrated in FIG. 4 was invented because it is a more optimum shape for this application than the commonly known lobed gear shapes, and because the shape of this pitch line can be determined by precise mathematical calculations. FIG. 4 illustrates a pair of these pitch lines in rolling contact, the major axis 12a of one being in contact with the minor axis 14b of the other. The pitch line comprises four equal aparts bounded by major axis 14a and the minor axis 14b, each part being a mirror image of the other three. It is therefore necessary to describe the shape of only one of said parts, as shown in FIG. 4. Each part of the pitch line in turn comprises four distinctly different segments, the first segment 14c beginning at the minor axis at point 14d being a semi-circular segment with a radius equal to the radius of the minor axis and ending at point 14e. The second segment 14f, beginning at 14e and ending at 14g, is a straight line tangent to 14c. The third segment 14h, beginning at 14g and ending at 14i, is a curve derived from the second segment by precise mathematical relationships between the pitch radii and the angular displacements of two mating gears. The fourth segment 14j, beginning at 14i and ending at the major axis at point 14k, is a semi-circular segment with a radius equal to the radius of the major axis.

The precise mathematical means for determining the shape of the third segment 14h and the included angles of each segment will now be explained in detail. To begin with, certain quantities and relationships are known. The example illustrated in FIG. 4 shows a bi-lobe gear in which the pitch radius at the major axis is twice that of the minor axis. This is for the purpose of illustration only since the method of calculation is the same when the ratio of the pitch radii is made more or less than 2:1. Since the major axis of one bi-lobe gear will be in mesh with the minor axis of its mating gear, the distance between the centers of the two gears is equal to the major pitch radius plus the minor pitch radius. For clarity of illustration, a value of unity will be assigned to the pitch radius at the minor axis. The pitch radius at the major axis will have a value of 2.0 and the center distance a value of 3.0. Note further that the pitch line from the mid-point 14g to the major axis at point 14k must be precisely the same length as the pitch line from said mid-point to the minor axis at point 14d in order to maintain pure rolling contact. The pitch radii of the two mating gears must also be equal at said mid-point, or 1.5 in FIG. 4.

With these values established, the necessary calculations can be made to determine the pitch radius at any point along tangent line 14f and the angular displacement from mid-point 14g corresponding thereto. It should be noted here that a right triangle is formed by radial line 14l intersecting tangent line 14f at a right angle at point 14e, the mid-point radial line 14m forming the hypotenuse thereof. Since the length of said mid-point line is known, the included angle of the tangent line 14f is the angle whose secant is one-half the center distance, which is 1.5 in FIG. 4. From appropriate trigonometric tables this angle is seen to be approximately 48.2 degrees.

The curve 14h of the third segment is derived from the tangent line 14f of the second segment by virtue of the above mentioned facts as known quantities necessary for the calculation thereof. Since the pitch radii of the two mating gears are equal at the mid-point 14g, it follows that any angular displacement of one gear away from the mid-point toward the minor radius will result in a lesser pitch radius being in rolling contact with a greater pitch radius at a corresponding point away from the mid-point toward the major axis of the mating gear, and at a lesser angular displacement. The value of the abovesaid greater pitch radius is the difference between the lesser pitch radius and the center distance. In FIG. 4 the smaller pitch radius will be a value less than 1.5 and the greater pitch radius will be a value correspondingly larger than 1.5. The value of the smaller pitch radius is equal to the hypotenuse of a lesser right triangular segment within the second segment, the included angle of which is said second segment reduced by said angular displacement. In FIG. 4 this is 48.2 degrees minus, for example, 0.2 degree, thereby leaving 48.0 degrees. The smaller pitch radius is the secant of 48.0 degrees, which is approximately 1.495 or .005 less than the mid-point. The correspondingly greater pitch radius of the mating gear then is 1.505, the value of any lesser pitch radius is likewise found by the above-mentioned trigonometric method for any angular displacement from the mid-point 14g to the minor pitch radius at point 14e, point 14i being the corresponding point upon the major pitch line which will be in rolling contact with point 14e of the minor pitch line. The angular relationship between any point upon the second segment 14f and the corresponding point of rolling contact upon the third segment 14h can now be found. For any very small angular displacement of the point of rolling contact from the mid-point 14g toward the minor pitch radius at point 14e, the corresponding angular displacement of the mating gear away from the mid-point is inversely proportional to the ratio of the two pitch radii at the new point of rolling contact, or the lesser pitch radius divided by the greater pitch radius times the angular displacement of the minor pitch line. The example above then would be 1.495 divided by 1.505 time 0.2 degree which is approximately .01987 degree. Calculation of any large displacement of the third segment then would be a summation of many very small angular displacement calculations by the above described method. The included angle of the third segment 14h can thereby be found. With the included angles of the second and third segments known, the included angles of the first and fourth segments can be calculated. The sum of the first and fourth segments is 90 degrees minus the sum of the second and third segments. The ratio of the included angles of the first and fourth segments is inversely proportional to the ratio of their respective radii, since the length of the two arcs must be equal for rolling contact. The ratio shown in FIG. 4 is 2:1 so the smaller semicircle will have an included angle twice that of the larger semicircle. Any point on 14h can therefore be derived from its corresponding point of rolling contact on 14f and since the distance along 14f, away from point 14e, is equal to the tangent of its included angle, the pitch length of each of the four equal mirror image parts of the bi-lobe gear pitch line is twice the length of the tangent line 14f plus the length of the two semicircular arcs. The number of teeth that can be used on these gears must be divisible by 2 but not divisible by 4 since a tooth at the minor axis must be in rolling contact with the space between two teeth at the major axis, or vice versa. The method of generating teeth upon the bi-lobe gear pitch lines will not be given here since it is well-known to those skilled in the art of designing lobed gears.

The axial reciprocity or stroke of a set of four of these bi-lobe gears, as used in the above described embodiment, can also be calculated by finding the angular displacement of bi-lobe gear 14, for instance, as shown in FIG. 1(a) for an angular displacement of 45 degrees of the main shaft and bi-lobe gear 12, as shown in FIG. 1(b) and subtracting said angular displacement of gear 14 from 45 degrees, the difference being equal to the angle of one half the stroke of one rotary piston. Since all of the half strokes of the rotary pistons are the same value of relative angular displacement, the total axial reciprocity or stroke of a pair of rotary pistons is four times the value of one half stroke of one piston. The method for finding the abovesaid angular displacement of bi-lobe gear 14 for the above mentioned 45 degree displacement of the main shaft is, of course, the same as the above described method of finding the angular displacement of the third segment 14h for a corresponding angular displacement of the second segment, together with the calculation of the relative displacements of the semi-circular arcs of the first segment 14c and the fourth segment 14j.

Other configurations of the present invention could include two or more pairs of rotary pistons geared to a single main shaft wherein either opposed, V, or radial configurations of the engines, pumps, or fluid motors, or combinations thereof, could be used for compactness and other advantages. It can be seen therefore that the present invention should be considered to include any and all modifications, alterations, or equivalent arrangements falling within the scope of the annexed claims.

Having thus described the invention, what is claimed is:

1. A rotary engine comprising: a housing defining a cylindrical chamber and having an inlet for the entrance of a fuel mixture thereto and an outlet for the discharge of combustion gases therefrom; a single fuel igniter mounted in the wall of said housing and communicating with the cylindrical chamber thereof; a pair of piston elements rotatably mounted alongside one another in said cylindrical chamber, each piston element having a pair of paddle members respectively extending from the opposite ends thereof and for the full width of said cylindrical chamber, the paddles of one piston element being interposed between the paddles of the other piston element to form four smaller chambers; and means mounted external to said housing and rigidly coupled to said pair of piston elements to vary the speed of each rotary piston element in a reciprocating manner relative to the other so that during one revolution thereof each of said four smaller chambers goes through the successive phases of fuel intake, fuel compression, fuel ignition, and fuel exhaust to produce four power pulses per revolution.

2. The rotary engine defined in claim 1 wherein said means includes a main shaft rotatably mounted in and extending through said housing parallel to the axis of said cylindrical chamber, a first pair of bi-lobe gears respectively mounted on said shaft on opposite sides of said housing and rotatable therewith, and a second pair of bi-lobe gears respectively positioned on opposite sides of said housing, said second pair of bi-lobe gears respectively being meshed with said first pair of gears and coupled to said pair of piston elements.

3. The rotary engine defined in claim 2 wherein said first and second pairs of bi-lobe gears are of identical shape and size, the pitch lines thereof being identical and having symmetrical lobes diametrically opposite one another, the shape of the pitch lines being such as to provide pure rolling contact to be maintained between each pair of mating gears throughout their rotation.

4. The rotary engine defined in claim 2 wherein said first pair of bi-lobe gears are positioned axially ninety degrees apart so that when one of said piston elements is instantaneously moving at maximum speed, the other of said piston elements is instantaneously moving at minimum speed, and the paddles of one piston element are instantaneously ninety degrees from the paddles of the other piston element.

5. The rotary engine defined in claim 1 wherein said engine further includes an axle rotatably mounted along the axis of said cylindrical chamber and extending through said housing; and wherein said pair of piston elements are mounted on said axle, said pair of piston elements respectively including a pair of hubs through which said axle passes and a pair of shank members through which said axle passes, said shank members respectively coupling said hubs to said means, one of said hubs being fixed to said axle to rotate therewith.

6. The rotary engine defined in claim 5 wherein said pair of hubs are mounted adjacent one another on said axle and the width of each is substantially one-half the width of said cylindrical chamber, and wherein the paddle members of each piston element extend radially outward from its hub to substantially the wall of said cylindrical chamber, the width of all paddle members being substantially equal to the width of said cylindrical chamber.

7. The rotary engine defined in claim 1 wherein said engine further includes an axle rotatably mounted along the axis of said cylindrical chamber and extending through said housing; wherein said means includes a main shaft rotatably mounted in and extending through said housing parallel to the axis of said cylindrical chamber, a first pair of bi-lobe gears respectively mounted on said shaft on opposite sides of said housing, and a second pair of bi-lobe gears respectively mounted on said axle on opposite sides of said housing, said first pair of bi-lobe gears being fixed to said shaft and rotatable therewith; and wherein said pair of piston elements are mounted on said axle, said pair of piston elements respectively including a pair of hubs through which said axle passes and a pair of shank members through which said axle passes, said shank members respectively coupling said hubs in said rigid manner to said second pair of bi-lobe gears, one of said hubs being fixed to said axle to rotate therewith.

8. The rotary engine defined in claim 7 wherein a pair of bearings are mounted between the other of said hubs and said axle.

9. The rotary engine defined in claim 1 wherein said paddle members include sealing means mounted along the periphery thereof to isolate said smaller chambers from one another, said paddle members and the sealing means thereof containing lubrication passages through which a lubricant flows under pressure, said sealing means including two sets of seals joined together by means of overlapping joints with the gaps of one set of seals being offset from and covered by the other set of seals.

References Cited

UNITED STATES PATENTS

| 3,398,643 | 8/1968 | Schudt | 91—60 |
| 2,933,940 | 4/1960 | Hallden | 74—437 |
| 3,130,683 | 4/1964 | Paschke et al. | |
| 3,203,405 | 8/1965 | Sabet. | |

FOREIGN PATENTS

| 1,298,987 | 6/1962 | France. |
| 641,476 | 2/1937 | Germany. |

LEONARD H. GERIN, Primary Examiner

U.S. Cl. X.R.

74—393